United States Patent Office 3,092,456
Patented June 4, 1963

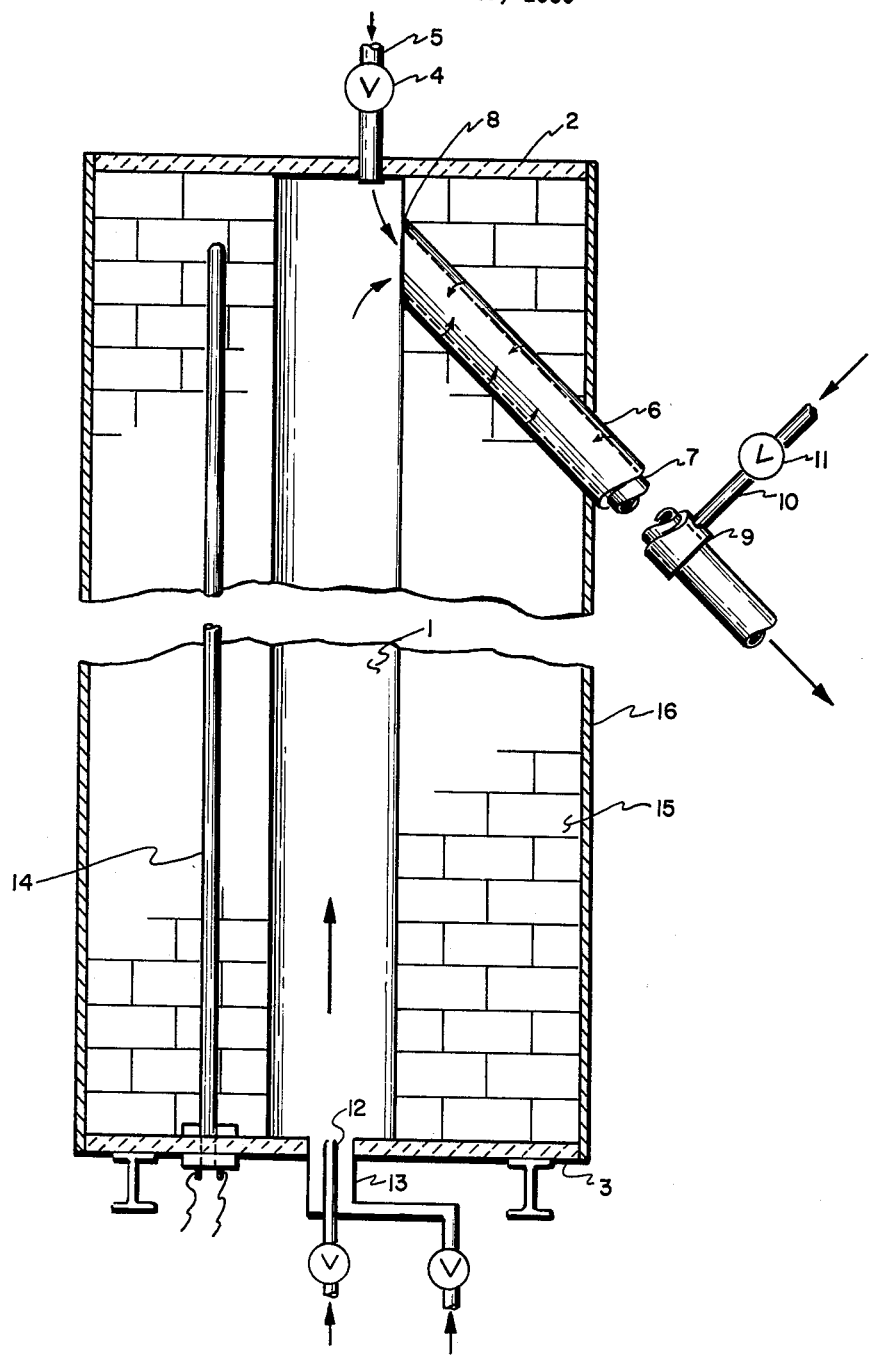
INVENTORS
EARL W. NELSON
T. J. CROSSLEY
BY
*Evans Kahn*
ATTORNEY

3,092,456
IRON CHLORIDE COMBUSTION
Earl W. Nelson, Lynchburg, and Thomas J. Crossley, Amherst, Va., assignors to American Cyanamid Company, New York, N.Y., a corporation of Maine
Filed Dec. 23, 1959, Ser. No. 861,601
4 Claims. (Cl. 23—200)

The present invention relates to the inhibition of formation of iron oxide incrustations downstream from the combustion zone of continuous reactors wherein iron chloride and oxygen are burned to form iron oxide and chlorine.

At the present time, iron chloride is produced in large amount as a by-product of the production of titanium tetrachloride by chlorination of an oxidic ferrotitaniferous material (usually ilmenite ore or slag derived therefrom). The economics of the process require that the chlorine content of the iron chloride be recovered for return to the chlorination cycle and make it desirable that a metallurgical useful grade of iron oxide be produced at the same time.

It is known that iron chloride (ferric chloride, ferrous chloride and mixtures thereof) undergoes combustion with oxygen in the temperature range of 500°–1000° C. to yield iron oxide and chlorine. The combustion is customarily performed by continuously introducing the reagents into a combustion zone in a continuous reactor at temperatures just specified.

The reaction is comparatively slow and it is usually impractical to provide apparatus sufficiently large to permit the reaction to proceed to equilibrium within the combustion zone. As a consequence, the discharge from the combustion zone (hereinafter termed "reaction product") contains unreacted iron chloride and unreacted oxygen. It is a principal disadvantage of the process that these two components tend to interact as the reaction product flows downstream from the combustion zone, with the result that incrustations of iron oxide material tend to form on the surrounding walls: see Sawyer U.S. Patent No. 2,642,339 (1953). Unless formations of these incrustations can be prevented, it is generally necessary to shut down the apparatus for cleaning.

The discovery has now been made that formation of iron oxide incrustations on the walls of the apparatus downstream from the combustion zone can be inhibited by inactivating unreacted oxygen in the reaction product. We have found that formation of these incrustations can be entirely prevented by chemically inactivating all the oxygen in the stream, and we have further found that the rate of formation of these incrustations is greatly decreased when only a part of the oxygen is inactivated. In other words, according to the invention part or all of the unreacted oxygen present is chemically converted to combined, inert form, whereby formation of iron oxide incrustations is more or less completely suppressed.

In activation of the oxygen may be accomplished by reacting the oxygen with any material known to combine therewith at the temperature of the main combustion reaction. Suitable materials for the purpose, for example, are hydrogen, ammonia, methane, producer gas, benzene, diethyl ether and acetone. The invention does not depend upon the particular material used. In practice we prefer to employ finely ground metallurgical coke (or other form of carbon), carbon monoxide, or mixtures thereof, as these materials inactivate the oxygen without combining with the chlorine which is present.

According to the invention, the inactivating agent for the oxygen present is introduced into the reaction product at any desired point downstream from the reaction zone. The effect of the agent is nearly instantaneous so that when complete mixing of the agent occurs, introducing the agent immediately upstream from the part of the system which it is desired to protect generally protects all the reactor downstream from that point throughout its length.

The need for complete mixing can be overcome by constructing the discharge tube of an inert fine-grained porous material, and percolating an inactivating gas transversely through the tube. The inactivating gas forms a continuous layer on the inside of the tube so that outwardly moving oxygen molecules in the gaseous reaction product are inactivated before they can contact the surface of the tube and react with iron chloride thereon.

The invention will be described more particularly with relation to the drawing, which represents schematically in vertical section a reactor adapted for performance of the process of the present invention, showing two methods for the introduction of inactivating agent.

The apparatus is largely composed of firebrick 15 laid to define vertical reaction tube 1. Firebrick 15 is covered at each end by ceramic discs 2 and 3 and is encased in cylindrical steel jacket 16 rendering the apparatus gastight. Tube 5 containing valve 4 extends through plate 2 for admission of inactivating gas.

Discharge tube 6 extends downwardly through the firebrick at an angle of about 45° from a point near the top of reaction tube 1, and contains loosely fitting porous ceramic liner 7 which is sealed to the discharge tube at both its ends 8 and 9. Tube 10 containing valve 11 passes through tube 6 whereby inactivating gas can be supplied under slight pressure into the space between discharge tube 6 and its porous liner 7.

Through the center of the bottom disc passes iron chloride supply tube 12 and, surrounding this tube, oxygen supply tube 13. Reaction tube 1 is surrounded by four high-capacity bayonet type electric heaters, of which one 14 is shown.

The apparatus is placed in operation by bringing reactor tube 1 to operating temperature by use of electrical heaters represented by heater 14. If desired, this preheating may be assisted or accomplished by supplying a carbon monoxide-oxygen mixture or other combustible mixture through nozzles 12 and 13, and inactivating agent is introduced into discharge pipe 6 through either or both of pipes 4 and 9 or in other convenient way as shown in the examples below. Iron chloride and oxygen are then introduced through nozzles 11 and 12 respectively in desired combustion ratio.

The current to the electrical heaters represented by 14 is decreased to maintain the reactor temperature within the desired range, and the total supply of inactivating agent or agents is adjusted so that no free oxygen is detected at the exit end of discharge tube 9.

The invention will be more particularly described with reference to the examples. These examples represent specific embodiments of the invention and are not to be construed as limitations thereon.

*Example 1*

The following illustrates the use of carbon monoxide as oxygen inactivating agent to prevent the formation of iron oxide incrustations.

The apparatus is composed of a vertical firebrick reactor tube 6" in diameter and 78" long, closed at its upper end with a ceramic disc. A gas inlet tube 1" in diameter extends vertically downwardly through this upper disc, and a discharge pipe 4" in diameter runs diagonally downward from the top of the reactor tube at an angle of 45° to a product recovery system.

The bottom of the reactor tube is closed with a two-tube burner of the concentric type shown in Frey U.S. Patent No. 2,779,662 (1957), iron chloride being introduced through the center tube and oxygen being supplied through the outer tube.

The reactor contains four 5 kw. bayonet electric heaters to supply heat as needed to maintain the reaction chamber at desired combustion temperature, and is encased in two feet of insulating brick.

The reactor is preheated by the electric heaters to 735° C. (as measured by thermocouples in the walls), and carbon monoxide at room temperature is admitted through the orifice at the top of the reactor at the rate of 4 lb./hr. Through the outer orifice at the bottom there is admitted oxygen at the rate of 14.5 lb./hr., and liquid iron chloride (containing 5% by weight of $FeCl_2$) at 325° C. is admitted through the center bottom orifice at the rate of 167 lb./hr.

At the end of five hours the discharge tube is inspected and is found to be free from iron oxide incrustations.

The carbon monoxide supply is then shut off and the run continued for five hours. The inside of the discharge tube carries a thick incrustation of iron oxide.

*Example 2*

The following illustrates the use of carbon as inactivating agent for the unreacted oxygen.

The reactor of Example 1 is modified by replacing the carbon monoxide supply tube with a gas-tight disc feeder set to feed solids at 3 lb./hr. The reactor is brought to operating temperature by the electric heaters, ferric chloride and oxygen are supplied as described in Example 1, coke (screened to −325 mesh) is supplied through the disc feeder at the set rate, and chlorine is admitted at the rate of 3 lb./hr. as carrier for the coke.

After five hours of operation the discharge tube is found to contain only a light incrustation of iron oxide material, showing that the coke inhibits formation of incrustations to a major extent.

*Example 3*

The apparatus of Example 1 is modified by inserting a porous ceramic liner 2″ in diameter into the discharge tube, cementing the ends of the porous liner to the existing discharge tube, and providing a tube to supply carbon monoxide gas to the space between the porous ceramic liner and the existing discharge tube, as shown in the drawing.

The procedure of Example 1 is repeated except that carbon monoxide under a pressure of 2 lb./in. is supplied through the porous liner instead of through the top of the reactor. No incrustations are observed on the porous tube after five hours of operation.

We claim:

1. In the manufacture of iron oxide wherein an iron chloride and oxygen are burned at 500°–1000° C. in a combustion zone in a continuous reactor thereby forming a reaction product consisting essentially of iron oxide particles, chlorine, unreacted oxygen, and unreacted iron chloride, the method of inhibiting formation of incrustations of iron oxide on the walls of the exit conduit of said reactor, which consists in chemically inactivating in said conduit at least part of said unreacted oxygen in said reaction product.

2. A process according to claim 1 wherein the oxygen is at least in part inactivated by reaction with carbon monoxide.

3. A process according to claim 1 whereby the oxygen is at least in part inactivated by reaction with carbon.

4. A process according to claim 1 wherein the oxygen is substantially completely inactivated.

References Cited in the file of this patent

UNITED STATES PATENTS

| 1,992,685 | Wescott | Feb. 26, 1935 |

FOREIGN PATENTS

| 641,801 | Great Britain | Aug. 23, 1950 |